US012671537B2

(12) United States Patent
Lin

(10) Patent No.: US 12,671,537 B2
(45) Date of Patent: Jun. 30, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 320 days.

(21) Appl. No.: 18/396,480

(22) Filed: Dec. 26, 2023

(65) Prior Publication Data

US 2024/0171333 A1 May 23, 2024

Related U.S. Application Data

(63) Continuation of application No. PCT/IB2021/000565, filed on Aug. 6, 2021.

(51) Int. Cl.
*H04L 5/00* (2006.01)
*H04W 72/0446* (2023.01)
*H04W 72/1273* (2023.01)
*H04W 74/0833* (2024.01)

(52) U.S. Cl.
CPC ....... *H04L 5/0048* (2013.01); *H04W 72/0446* (2013.01); *H04W 72/1273* (2013.01); *H04W 74/0833* (2013.01)

(58) Field of Classification Search
CPC ............ H04L 5/0048; H04W 72/0446; H04W 72/1273; H04W 74/0833
See application file for complete search history.

(56) References Cited

U.S. PATENT DOCUMENTS

| | | | | |
|---|---|---|---|---|
| 9,479,407 | B2 * | 10/2016 | Kim | ........................ H04L 43/08 |
| 2016/0219557 | A1 | 7/2016 | He | |
| 2019/0254013 | A1 | 8/2019 | Chang et al. | |
| 2020/0092044 | A1 | 3/2020 | Park et al. | |
| 2022/0053531 | A1 | 2/2022 | Sengupta | |
| 2022/0232503 | A1 * | 7/2022 | Cheng | ................. H04W 56/009 |

FOREIGN PATENT DOCUMENTS

| | | |
|---|---|---|
| CN | 110268659 A | 9/2019 |
| CN | 110612682 A | 12/2019 |
| CN | 110892690 A | 3/2020 |
| CN | 111133718 A | 5/2020 |

(Continued)

OTHER PUBLICATIONS

3GPP TR 38.821 V16.0.0 (Dec. 2019), 3rd Generation Partnership Project; Technical Specification Group Radio Access Network; Solutions for NR to support non-terrestrial networks (NTN) (Release 16). section 6.2. 140 pages.

(Continued)

*Primary Examiner* — Duc C Ho

(74) *Attorney, Agent, or Firm* — BAYES PLLC

(57) ABSTRACT

An apparatus and a method of wireless communication are provided. The method by a user equipment (UE) includes determining a first subframe, and/or determining a second subframe according to the first subframe, and performing a physical downlink control channel (PDCCH) monitoring according to the first subframe and/or the second subframe.

20 Claims, 3 Drawing Sheets

200

202 — Determining a first subframe and/or determining a second subframe according to the first subframe 204 — Performing a physical downlink control channel (PDCCH) monitoring according to the first subframe and/or the second subframe

(56)     References Cited

FOREIGN PATENT DOCUMENTS

| | | | |
|---|---|---|---|
| CN | 112930707 A | 6/2021 | |
| WO | WO-2018064583 A1 * | 4/2018 | ........... H04L 5/0055 |
| WO | 2018084487 A1 | 5/2018 | |
| WO | 2019119411 A1 | 6/2019 | |
| WO | 2022035540 A1 | 2/2022 | |

OTHER PUBLICATIONS

International Search Report in the international application No. PCT/IB2021/000565, mailed on Jul. 4, 2022. 6 pages.
Written Opinion of the International Search Authority in the international application No. PCT/IB2021/000565, mailed on Jul. 4, 2022. 14 pages.
Samsung: "Timing relationship enhancements", 3GPP Draft; R1-2105347, 3rd Generation Partnership Project (3GPP), Mobile Competence Centre; 650, Route Des Lucioles; F-06921 Sophia-Antipolis Cedex; France, vol. RAN WG1, No. e-Meeting; May 10, 2021-May 27, 2021 May 12, 2021 (May 12, 2021), XP052011388, the whole document. 3 pages.
First Office Action of the Chinese application No. 202180097191.6, issued on Oct. 8, 2024, 29 pages with English translation.
Second Office Action of the Chinese application No. 202180097191.6, issued on Dec. 27, 2024. 25 pages with English translation.
Third Office Action of the Chinese application No. 202180097191.6, issued on Mar. 18, 2025. 34 pages with English translation.
Reject Decision of the Chinese application No. 202180097191.6, issued on Jun. 23, 2025.

* cited by examiner

30

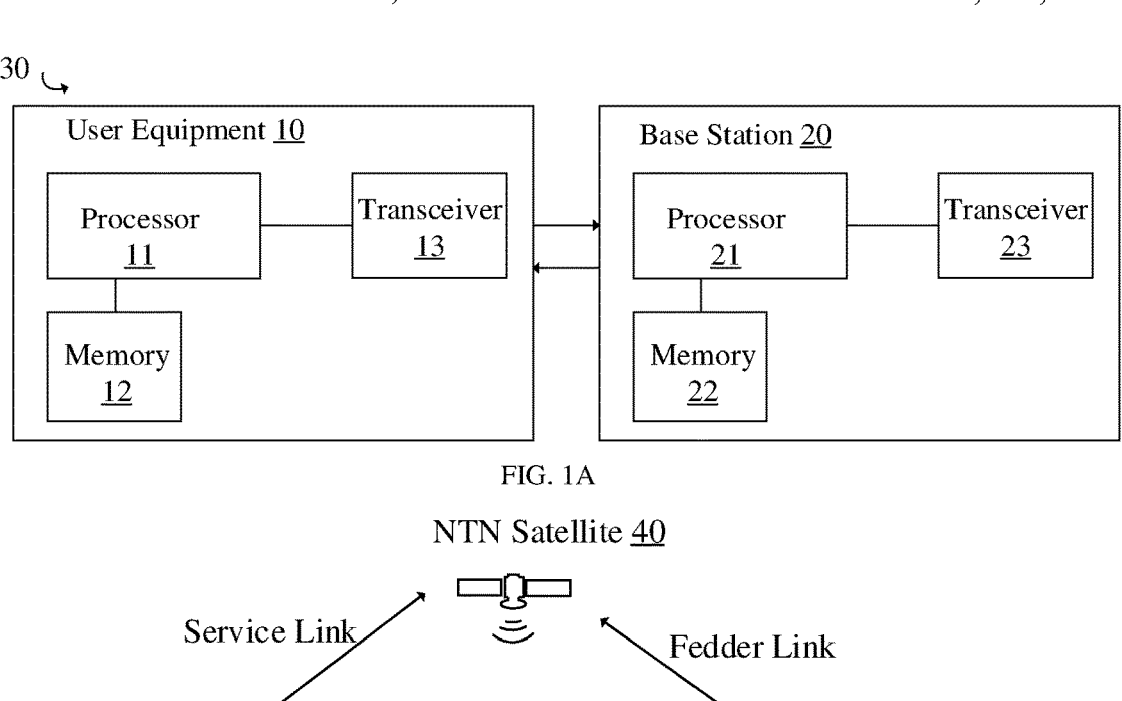

FIG. 1A

NTN Satellite 40

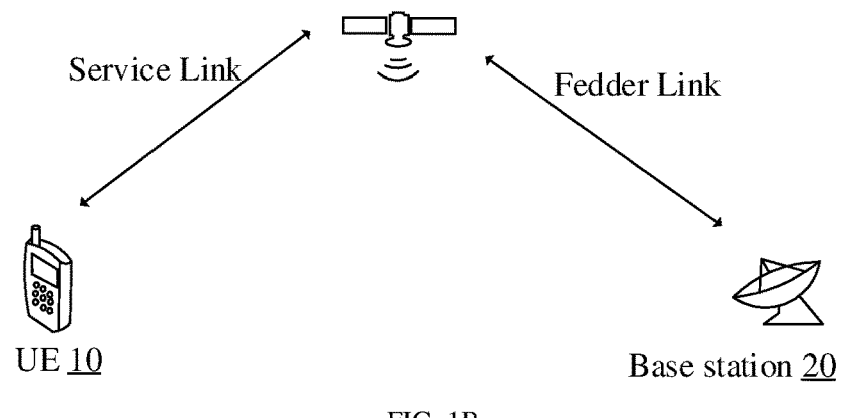

FIG. 1B

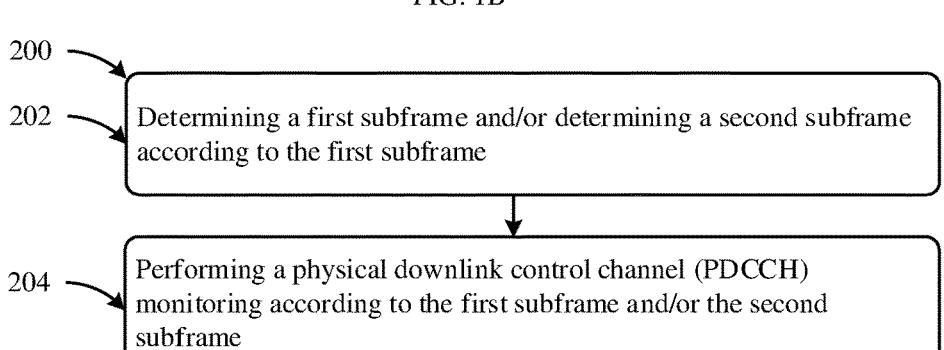

200

202 — Determining a first subframe and/or determining a second subframe according to the first subframe 204 — Performing a physical downlink control channel (PDCCH) monitoring according to the first subframe and/or the second subframe

FIG. 2

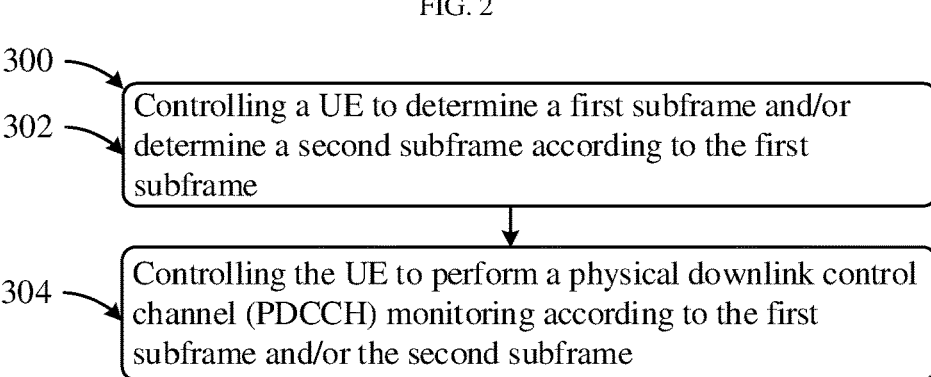

300

302 — Controlling a UE to determine a first subframe and/or determine a second subframe according to the first subframe 304 — Controlling the UE to perform a physical downlink control channel (PDCCH) monitoring according to the first subframe and/or the second subframe

FIG. 3

APPARATUS AND METHOD OF WIRELESS COMMUNICATION

CROSS-REFERENCE TO RELATED APPLICATION

This is a continuation application of International Patent Application No. PCT/IB2021/000565, filed on Aug. 6, 2021, entitled "APPARATUS AND METHOD OF WIRELESS COMMUNICATION", the content of which is hereby incorporated by reference in its entirety.

BACKGROUND OF DISCLOSURE

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g. extremely rural, or due to high deployment cost, e.g. middle of ocean or mountain peak. Nowadays, the satellite communication is a separate technology to a 3rd generation partnership project (3GPP) cellular technology. Coming to 5G era, these two technologies can merge together, i.e. we can imagine having a 5G terminal that can access to a cellular network and a satellite network. The NTN can be good candidate technology for this purpose. It is to be designed based on 3GPP new radio (NR) with necessary enhancement.

In NTN, different satellite deployment scenarios can be used. When LEO satellite is deployed, satellite velocity can augment up to more than 7 km/s, which is greatly beyond a maximum mobility speed experienced in a terrestrial network, e.g. high-speed train has a maximum speed of 500 km/h. For this reason, a transmitter as well as a receiver will face a much wider range of frequency offset and/or Doppler offset (shift). This frequency offset and/or Doppler offset (shift), due to high velocity of satellite motion, will become a severe issue to be addressed in the NTN network. However, in legacy terrestrial, there is no specified work on the frequency offset and/or Doppler offset (shift) mitigation.

internet of things (IoT) operation is critical in remote areas with low/no cellular connectivity for many different industries, including e.g., transportation (maritime, road, rail, air) & logistics, solar, oil & gas harvesting, utilities, farming, environment monitoring, and mining etc. The capabilities of narrowband Internet of things (NB-IoT) are a good fit to the above but will require satellite connectivity to provide coverage beyond terrestrial deployments, where IoT connectivity is required. There is an urgent need for a standardized solution allowing global IoT operation anywhere on Earth, in view of other solutions already available. It is important that satellite NB-IoT be defined in a complementary manner to terrestrial deployments.

In NTN, due to a high velocity of a satellite as well as a half-duplex of IoT device, there is a need for designing a gap in which a user equipment (UE) may perform a synchronization, a timing advance adjustment, or a global navigation satellite system (GNSS) measurement.

Therefore, there is a need for an apparatus (such as a user equipment (UE) and/or a base station) and a method of wireless communication, which can solve issues in the prior art, provide a method for UE operation in non-terrestrial network (NTN) systems, reduce signaling overhead, provide a good communication performance, and/or provide high reliability.

SUMMARY

The present disclosure relates to the field of communication systems, and more particularly, to an apparatus and a method of wireless communication. An object of the present disclosure is to propose an apparatus (such as a user equipment (UE) and/or a base station) and a method of wireless communication, provide a method for UE operation in non-terrestrial network (NTN) systems.

In a first aspect of the present disclosure, a method of wireless communication by a user equipment (UE) comprises determining a first subframe, and/or determining a second subframe according to the first subframe, and performing a physical downlink control channel (PDCCH) monitoring according to the first subframe and/or the second subframe.

In a second aspect of the present disclosure, a method of wireless communication by a base station comprises controlling a user equipment (UE) to determine a first subframe, and/or determine a second subframe according to the first subframe, and performing a physical downlink control channel (PDCCH) monitoring according to the first subframe and/or the second subframe.

In a third aspect of the present disclosure, a user equipment comprises a memory, a transceiver, and a processor coupled to the memory and the transceiver. The processor is configured to determine a first subframe, and/or determine a second subframe according to the first subframe, and perform a physical downlink control channel (PDCCH) monitoring according to the first subframe and/or the second subframe.

In a fourth aspect of the present disclosure, a base station comprises a memory, a transceiver, and a processor coupled to the memory and the transceiver. The processor is configured to control a UE to determine a first subframe, and/or determine a second subframe according to the first subframe, and perform a physical downlink control channel (PDCCH) monitoring according to the first subframe and/or the second subframe.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1A is a block diagram of one or more user equipments (UEs) and a base station (e.g., gNB or eNB) of communication in a communication network system (e.g., non-terrestrial network (NTN) or a terrestrial network) according to an embodiment of the present disclosure.

FIG. 1B is a block diagram of one or more user equipments (UEs) and a base station (e.g., gNB or eNB) of communication in a non-terrestrial network (NTN) system according to an embodiment of the present disclosure.

FIG. 2 is a flowchart illustrating a method of wireless communication performed by a user equipment (UE) according to an embodiment of the present disclosure.

FIG. 3 is a flowchart illustrating a method of wireless communication performed by a base station according to an embodiment of the present disclosure.

DETAILED DESCRIPTION OF EMBODIMENTS

Figures 4, 5, 6, 7, 8:
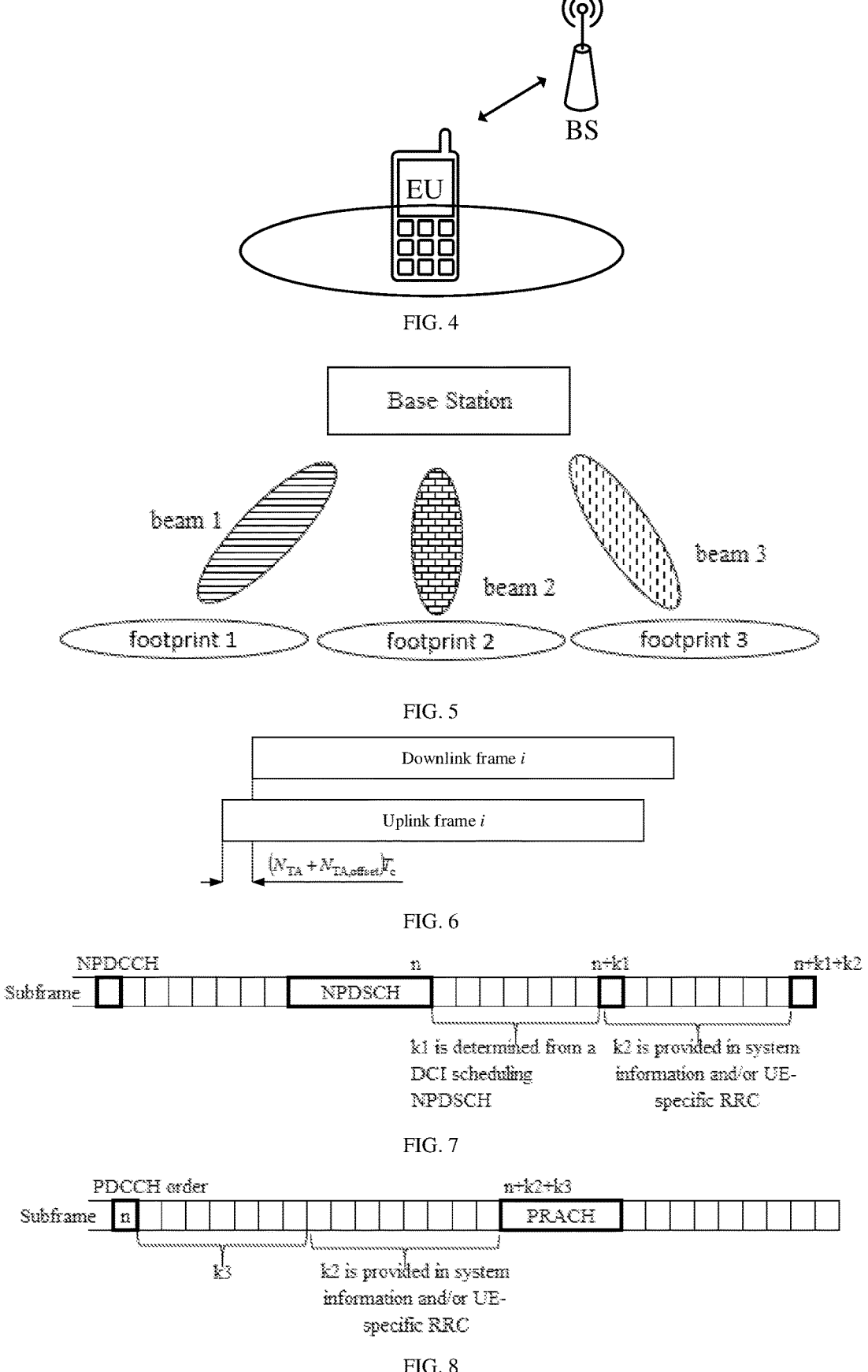
FIG. 4 is a schematic diagram illustrating a communication system including a base station (BS) and a UE according to an embodiment of the present disclosure.
FIG. 5 is a schematic diagram illustrating that a BS transmits 3 beams to the ground forming 3 footprints according to an embodiment of the present disclosure.
FIG. 6 is a schematic diagram illustrating an uplink-downlink timing relation according to an embodiment of the present disclosure.
FIG. 7 is a schematic diagram illustrating an example of an NPUSCH transmission starting resource determination according to an embodiment of the present disclosure.
FIG. 8 is a schematic diagram illustrating an example of a PDCCH order according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

FIG. 1A illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the communication between the UE 10 and the BS 20 comprises non-terrestrial network (NTN) communication. In some embodiments, the base station 20 comprises spaceborne platform or airborne platform or high altitude platform station. The base station 20 can communicate with the UE 10 via a spaceborne platform or airborne platform, e.g., NTN satellite 40, as illustrated in FIG. 1B.

FIG. 1B illustrates a system which includes a base station 20 and one or more UEs 10. Optionally, the system may include more than one base station 20, and each of the base stations 20 may connect to one or more UEs 10. In this disclosure, there is no limit. As an example, the base station 20 as illustrated in FIG. 1B may be a moving base station, e.g. spaceborne vehicle (satellite) or airborne vehicle (drone). The UE 10 can transmit transmissions to the base station 20 and the UE 10 can also receive the transmission from the base station 20. Optionally, not shown in FIG. 1B, the moving base station can also serve as a relay which relays the received transmission from the UE 10 to a ground base station or vice versa. Optionally, a satellite 40 may be seen as a relay point which relays the communications between a UE 10 and a base station 20, e.g. gNB/eNB. Spaceborne platform includes satellite 40 and the satellite 40 includes LEO satellite, MEO satellite, and GEO satellite. While the satellite 40 is moving, the LEO satellite and MEO satellite are moving with regard to a given location on earth. However, for GEO satellite, the GEO satellite is relatively static with regard to a given location on earth. In some embodiments of this disclosure, some embodiments focus on the LEO satellite type or MEO satellite type, for which some embodiments of the disclosure aim at resolving an issue of wider range of frequency offset and/or Doppler offset (shift).

Spaceborne platform includes satellite and the satellite includes low earth orbiting (LEO) satellite, medium earth orbiting (MEO) satellite and geostationary earth orbiting (GEO) satellite. While the satellite is moving, the LEO and MEO satellite is moving with regard to a given location on earth. However, for GEO satellite, the GEO satellite is relatively static with regard to a given location on earth.

In some embodiments, the processor 11 is configured to determine a first subframe, and/or determine a second subframe according to the first subframe, and perform a physical downlink control channel (PDCCH) monitoring according to the first subframe and/or the second subframe. This can solve issues in the prior art, provide a method for UE operation in non-terrestrial network (NTN) systems, reduce signaling overhead, provide a good communication performance, and/or provide high reliability.

In some embodiments, the processor 21 is configured to control the UE 10 to determine a first subframe, and/or determine a second subframe according to the first subframe, and perform a physical downlink control channel (PDCCH) monitoring according to the first subframe and/or the second subframe. This can solve issues in the prior art, provide a method for UE operation in non-terrestrial network (NTN) systems, reduce signaling overhead, provide a good communication performance, and/or provide high reliability. In some embodiments, the PDCCH comprises a narrowband PDCCH (NPDCCH).

FIG. 2 illustrates a method 200 of wireless communication by a user equipment (UE) 10 according to an embodiment of the present disclosure. In some embodiments, the method 200 includes: a block 202, determining a first subframe and/or determining a second subframe according to the first subframe, and a block 204, performing a physical downlink control channel (PDCCH) monitoring according to the first subframe and/or the second subframe. This can solve issues in the prior art, provide a method for UE operation in non-terrestrial network (NTN) systems, reduce signaling overhead, provide a good communication performance, and/or provide high reliability.

FIG. 3 illustrates a method 300 of wireless communication by a base station 20 according to an embodiment of the present disclosure. In some embodiments, the method 300 includes: a block 302, controlling a UE to determine a first subframe and/or determine a second subframe according to the first subframe, and a block 304, controlling the UE to perform a physical downlink control channel (PDCCH) monitoring according to the first subframe and/or the second subframe. This can solve issues in the prior art, provide a method for UE operation in non-terrestrial network (NTN) systems, reduce signaling overhead, provide a good communication performance, and/or provide high reliability.

In some embodiments, the UE is configured to receive a first transmission, and the first transmission ends in the first subframe. In some embodiments, the first transmission comprises a narrowband physical downlink shared channel (NPDSCH) transmission or a narrowband physical downlink control channel (NPDCCH) transmission. In some embodiments, the NPDSCH transmission is scheduled by a downlink control information (DCI) format. In some embodiments, the DCI format comprises a DCI format N1 and/or a DCI format N2. In some embodiments, the NPDCCH is configured with a PDCCH order. In some embodiments, the PDCCH order initiates a random access channel (RACH) procedure. In some embodiments, the UE is configured to perform a second transmission starting in the second subframe or starting later than the second subframe. In some embodiments, the second transmission comprises a narrowband physical uplink shared channel (NPUSCH) transmission or a physical random access channel (PRACH) transmission. In some embodiments, the NPUSCH transmission comprises an acknowledgement (ACK)/non-acknowledgement (NACK) information corresponding to the reception of the first transmission. In some embodiments, the PRACH transmission is requested by the PDCCH order. In some embodiments, the UE determining the second subframe according to the first subframe comprises that the second subframe is a number of subframes after the first subframe, where the number comprises a first amount and/or a second amount and/or a third amount. In some embodiments, the PRACH transmission comprises a narrowband PRACH transmission (NPRACH).

In some embodiments, the first amount is determined at least from a first information, and the DCI format provides the first information. In some embodiments, the second amount is determined at least from a second information, and the second information is provided in a system information and/or a UE-specific radio resource control (RRC). In some embodiments, the second amount is relevant to a timing advance. In some embodiments, the second information comprises a first time duration or a second number of subframes. In some embodiments, the second amount is greater than or equal to the second number. In some embodiments, the second amount comprises a first integer, and the first integer is a smallest integer such that the first integer times a subframe duration is greater than or equal to the first time duration. In some embodiments, the third amount is a pre-defined or pre-configured value. In some embodiments, the third amount is greater than or equal to 8. In some embodiments, the first subframe comprises a first subframe index, and the second subframe comprises a second subframe index. In some embodiments, the UE is not required to monitor a NPDCCH in a subframe after the first subframe and before the second subframe. In some embodiments, the UE is not required to monitor a NPDCCH in a subframe after a subframe corresponding to the first subframe index and before a subframe corresponding to the second subframe index. In some embodiments, the UE is configured to transmit a first transmission, and the first transmission ends in the first subframe.

In some embodiments, the first transmission comprises a NPUSCH transmission, and the NPUSCH is associated with a hybrid automatic repeat request (HARQ) process identifier (ID). In some embodiments, the second subframe is a number of subframes after the first subframe, where the number comprises a third amount. In some embodiments, the third amount is relevant to a time offset between a downlink timing and an uplink timing. In some embodiments, the third amount is determined at least from a third information, and the third information is provided in a system information and/or a UE-specific RRC. In some embodiments, the third information is used to determine a media access control-control element (MAC-CE) validation time. In some embodiments, the third information is K_mac. In some embodiments, the third information comprises a second time duration or a third number of subframes. In some embodiments, the third amount is greater than or equal to the third number. In some embodiments, the third amount comprises a second integer, and the second integer is a smallest integer such that the second integer times a subframe duration is greater than or equal to the second time duration. In some embodiments, the UE expects to receive a second transmission in the second subframe or after the second subframe. In some embodiments, the second transmission comprises a second NPDCCH transmission, and the NPDCCH comprises a second DCI format. In some embodiments, the DCI format schedules a second NPUSCH transmission, and the second NPUSCH transmission is performed by the UE. In some embodiments, the NPUSCH is associated with the HARQ process ID. In some embodiments, the UE does not expect to receive the second transmission in a subframe after the first subframe and before the second subframe. In some embodiments, a subframe in which the UE performs the PDCCH monitoring uses a downlink subframe timing. In some embodiments, the downlink subframe timing assumes a timing advance equal to zero. In some embodiments, the first subframe and/or the second subframe uses the downlink subframe timing.

FIG. 4 illustrates a communication system including a base station (BS) and a UE according to another embodiment of the present disclosure. Optionally, the communication system may include more than one base station, and each of the base stations may connect to one or more UEs. In this disclosure, there is no limit. As an example, the base station illustrated in FIG. 1A may be a moving base station, e.g., spaceborne vehicle (satellite) or airborne vehicle (drone). The UE can transmit transmissions to the base station and the UE can also receive the transmission from the base station. Optionally, not shown in FIG. 4, the moving base station can also serve as a relay which relays the received transmission from the UE to a ground base station or vice versa.

Spaceborne platform includes satellite and the satellite includes LEO satellite, MEO satellite and GEO satellite. While the satellite is moving, the LEO and MEO satellite is moving with regards to a given location on earth. However, for GEO satellite, the GEO satellite is relatively static with regards to a given location on earth. A moving base station or satellite, e.g., in particular for LEO satellite or drone, communicates with a user equipment (UE) on the ground. Due to long distance between the UE and the base station on satellite, the beamformed transmission is needed to extend the coverage.

Optionally, as illustrated in FIG. 5, where a base station is integrated in a satellite or a drone, and the base station transmits one or more beams to the ground forming one or more coverage areas called footprint. In FIG. 5, an example illustrates that the BS transmits three beams (beam 1, beam 2 and beam3) to form three footprints (footprint 1, 2 and 3), respectively. Optionally, 3 beams are transmitted at 3 different frequencies. In this example, the bit position is associated with a beam. FIG. 5 illustrates that, in some embodiments, a moving base station, e.g., in particular for LEO satellite or drone, communicates with a user equipment (UE) on the ground. Due to long distance between the UE and the base station on satellite, the beamformed transmission is needed to extend the coverage. As illustrated in FIG. 5, where a base station is transmitting three beams to the earth forming three coverage areas called footpoints. Moreover, each beam may be transmitted at dedicated frequencies so that the beams for footprint 1, 2 and 3 are non-overlapped in a frequency domain. The advantage of having different frequencies corresponding to different beams is that the inter-beam interference can be minimized.

In some embodiments, a moving base station (BS), e.g., in particular for LEO satellite or drone, communicates with a user equipment (UE) on the ground. A round trip time (RTT) between the BS and the UE is time varying. The RTT variation is related to a distance variation between the BS and the UE. The RTT variation rate is proportional to a BS motion velocity. To ensure a good uplink synchronization, the BS will adjust an uplink transmission timing and/or frequency for the UE. In some embodiments of this disclosure, a method for uplink synchronization adjustment is provided, and the uplink synchronization adjustment comprises at least one of the followings: a transmission timing adjustment or a transmission frequency adjustment. Optionally, the transmission timing adjustment further comprises a timing advance (TA) adjustment.

FIG. 6 illustrates an uplink-downlink timing relation according to an embodiment of the present disclosure. FIG. 6 illustrates that, in some embodiments, downlink, uplink, and sidelink transmissions are organized into frames with $T_f=(\Delta f_{max} N_f/100)\cdot T_c=10$ ms duration, each consisting of ten subframes of $T_{sf}=(\Delta f_{max} N_f/1000)\cdot T_c=1$ ms duration. $T_f$ refers to a radio frame duration. $\Delta f$ refers to subcarrier spacing. $n_f$ refers to a system frame number (SFN). $T_c$ refers to a basic time unit for NR. $T_{sf}$ refers to a subframe duration. The number of consecutive orthogonal frequency division multiplexed (OFDM) symbols per subframe is $$N_{symb}^{subframe,\mu} = N_{symb}^{slot} N_{slot}^{subframe,\mu}.$$

$$N_{symb}^{subframe,\mu}$$

refers to number of OFDM symbols per subframe for subcarrier spacing configuration $\mu$.

$$\mu \cdot N_{symb}^{slot}$$

refers to number of symbols per slot.

$$N_{slot}^{subframe,\mu}$$

refers to number of slots per subframe for subcarrier spacing configuration $\mu$. Each frame is divided into two equally-sized half-frames of five subframes each with half-frame 0 consisting of subframes 0 to 4 and half-frame 1 consisting of subframes 5 to 9. There is one set of frames in the uplink and one set of frames in the downlink on a carrier. Uplink frame number i for transmission from the UE starts $T_{TA}=(N_{TA}+ N_{TA,offset})T_c$ before the start of the corresponding downlink frame at the UE where $N_{TA,offset}$ is given by TS 38.213, except for a message A (msgA) transmission on physical uplink shared channel (PUSCH) where $T_{TA}=0$ is used. $T_{TA}$ refers to timing advance between downlink and uplink. $N_{TA}$ refers to timing advance between downlink and uplink. $N_{TA,offset}$ refers to a fixed offset used to calculate the timing advance. $T_c$ refers to a basic time unit for NR.

In some examples, a method for UE operation in NTN systems is provided. The exemplary method includes the IoT UE HARQ-ACK NPUSCH transmission subframe determination, PDCCH order requested PRACH transmission subframe and NPUSCH scheduling.

The examples given in this disclosure can be applied for IoT device or NB-IoT UE in NTN systems but the method is not exclusively restricted to NTN system nor for IoT devices or NB-IoT UE.

Example 1: NPUSCH Transmission Starting Resource Determination

FIG. 7 illustrates an example of an NPUSCH transmission starting resource determination according to an embodiment of the present disclosure. FIG. 7 illustrates that, in some examples, a UE receives a NPDSCH transmission ending in subframe (SF) n, and the NPDSCH is transmitted by a network to the UE. The NPDSCH is scheduled by a DCI format (for example DCI format N1 and/or N2). After the NPDSCH reception, the UE can transmit an ACK/NACK feedback to the network. The ACK/NACK information is transmitted by the UE in a NPUSCH transmission. The NPUSCH transmission starts in SF n+k1+k2, wherein the value of k1 is determined from a first indicated value, where the first indicated value is given in the DCI format. The value of k2 is provided by the network in a system information and/or a UE specific RRC configuration. In some examples, the UE is configured with one or more (such as two) HARQ processes. The UE is not required to monitor NPDCCH from SF n+1 to SF n+k1+k2-1.

Example 2: PDCCH Order

FIG. 8 illustrates an example of a PDCCH order according to an embodiment of the present disclosure. FIG. 8 illustrates that, in some examples, a UE receives a PDCCH order ending in subframe n, the UE can start NPRACH transmission if requested by higher layers, at the end of the first subframe n+k2+k3, where an NPRACH resource is available. Here k2 is provided in system information and/or UE specific RRC configuration and k3 is a pre-defined offset, which is greater than or equal to 8. In some examples, a value of offset comprises a number of subframes or time. In some examples, a unit of time comprises milliseconds, microseconds, or nanoseconds. In some examples, the UE is not required to monitor NPDCCH from subframe n+1 to subframe n+k2+k3-1.

Example 3: Same HARQ Process Scheduling

Figure 9:
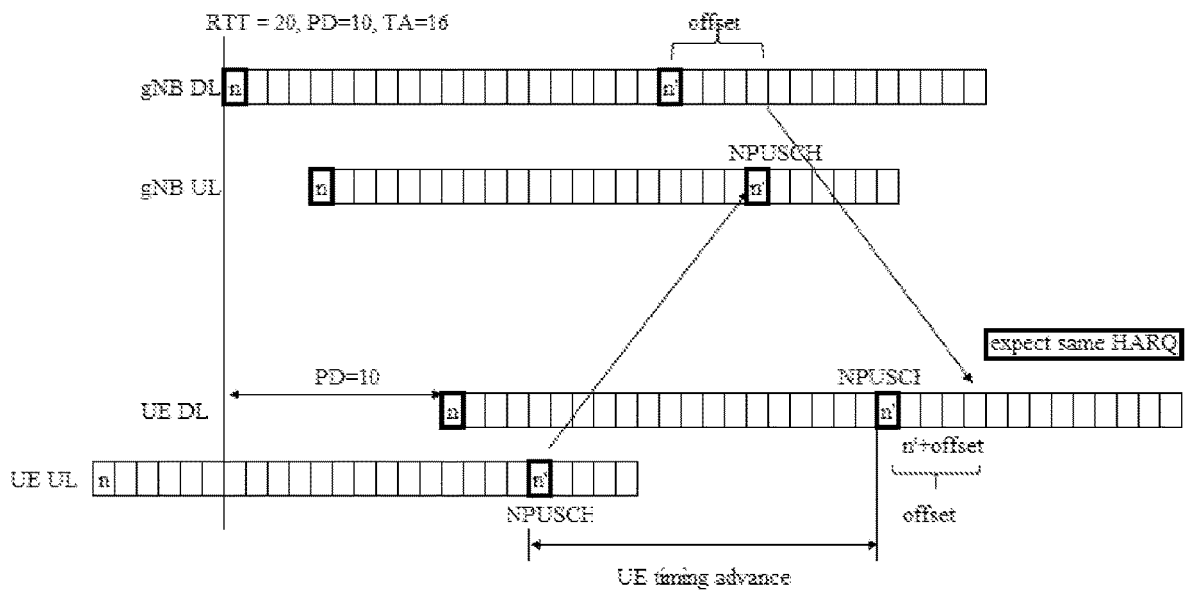
FIG. 9 is a schematic diagram illustrating an example of a same HARQ process scheduling according to an embodiment of the present disclosure.

FIG. 9 illustrates an example of a same HARQ process scheduling according to an embodiment of the present disclosure. FIG. 9 illustrates that, in some examples, a UE transmits a NPUSCH ending in subframe n', the UE is not expected to receive an NPDCCH with DCI format NO/N1 scheduling a same HARQ process ID as the NPUSCH transmission before subframe n'+offset, where the offset is provided by the network in a system information and/or a UE specific RRC configuration. In some examples, the UE is expected to receive an NPDCCH with DCI format NO/N1 scheduling a same HARQ process ID as the NPUSCH transmission after subframe n'+offset.

Commercial interests for some embodiments are as follows. 1. Solving issues in the prior art. 2. Providing a method for UE operation in non-terrestrial network (NTN) systems. 3. Reducing signaling overhead. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 10:
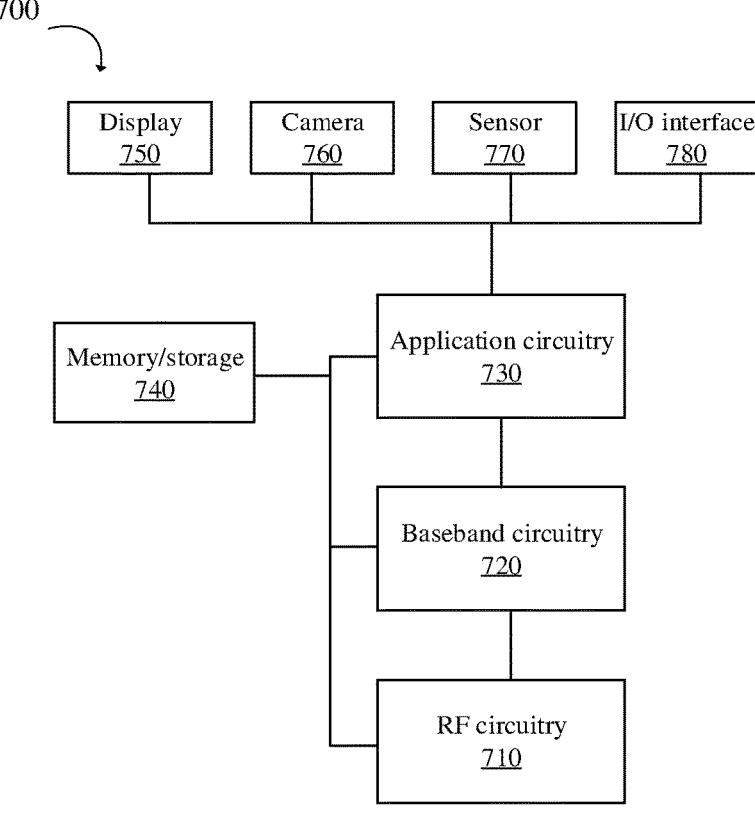
FIG. 10 is a block diagram of a system for wireless communication according to an embodiment of the present disclosure.

FIG. 10 is a block diagram of an example system 700 for wireless communication according to an embodiment of the present disclosure. Embodiments described herein may be implemented into the system using any suitably configured hardware and/or software. FIG. 10 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or nonvolatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
   determining a first subframe; and/or determining a second subframe according to the first subframe; and
   performing a physical downlink control channel (PDCCH) monitoring according to the first subframe and/or the second subframe, wherein the UE is not required to monitor a narrowband physical downlink control channel (NPDCCH) in a subframe after the first subframe and before the second subframe.

2. The method of claim 1, wherein the UE is configured to receive a first transmission, and the first transmission ends in the first subframe.

3. The method of claim 2, wherein the first transmission comprises a narrowband physical downlink shared channel (NPDSCH) transmission or an NPDCCH transmission,
   wherein the NPDSCH transmission is scheduled by a downlink control information (DCI) format,
   wherein the DCI format comprises a DCI format N1 and/or a DCI format N2,
   wherein the NPDCCH is configured with a PDCCH order, and
   wherein the PDCCH order initiates a random access channel (RACH) procedure.

4. The method of claim 1, wherein the UE is configured to perform a second transmission starting in the second subframe or starting later than the second subframe,
   wherein the second transmission comprises a narrowband physical uplink shared channel (NPUSCH) transmission or a physical random access channel (PRACH) transmission,
   wherein the NPUSCH transmission comprises an acknowledgement (ACK)/non-acknowledgement (NACK) information corresponding to the reception of the first transmission,
   wherein the PRACH transmission is requested by the PDCCH order.

5. The method of claim 1, wherein the UE determining the second subframe according to the first subframe comprises that the second subframe is a number of subframes after the first subframe, where the number comprises a first amount and/or a second amount and/or a third amount,
   wherein the first amount is determined at least from a first information, and the DCI format provides the first information,
   wherein the second amount is determined at least from a second information, and the second information is provided in a system information and/or a UE-specific radio resource control (RRC).

6. The method of claim 5, wherein the second amount is relevant to a timing advance,
   wherein the second information comprises a first time duration or a second number of subframes,
   wherein the second amount is greater than or equal to the second number; and/or the second amount comprises a first integer, and the first integer is a smallest integer such that the first integer times a subframe duration is greater than or equal to the first time duration.

7. The method of claim 5, wherein the third amount is a pre-defined or pre-configured value, wherein the third amount is greater than or equal to 8.

8. A wireless communication method by a base station comprising:

controlling a user equipment (UE) to determine a first subframe; and/or determine a second subframe according to the first subframe; and controlling the UE to perform a physical downlink control channel (PDCCH) monitoring according to the first subframe and/or the second subframe, wherein the base station controls the UE in a way that the UE is not required to monitor a narrowband physical downlink control channel (NPDCCH) in a subframe after the first subframe and before the second subframe.

9. The method of claim 8, wherein the base station controls the UE to receive a first transmission, and the first transmission ends in the first subframe, wherein the first transmission comprises a narrowband physical downlink shared channel (NPDSCH) transmission or an NPDCCH transmission, wherein the NPDSCH transmission is scheduled by a downlink control information (DCI) format, and wherein the DCI format comprises a DCI format N1 and/or a DCI format N2.

10. The method of claim 8, wherein the first subframe comprises a first subframe index, and the second subframe comprises a second subframe index, the base station further controls the UE in a way that the UE is not required to monitor an NPDCCH in a subframe after a subframe corresponding to the first subframe index and before a subframe corresponding to the second subframe index.

11. The method of claim 8, wherein the base station controls the UE to transmit a first transmission, and the first transmission ends in the first subframe, wherein the first transmission comprises a narrowband physical uplink shared channel (NPUSCH) transmission, and the NPUSCH is associated with a hybrid automatic repeat request (HARQ) process identifier (ID), wherein the second subframe is a number of subframes after the first subframe, where the number comprises a third amount, and wherein the third amount is relevant to a time offset between a downlink timing and an uplink timing.

12. A user equipment (UE), comprising:

a memory;

a transceiver; and a processor coupled to the memory and the transceiver;

wherein the processor is configured to perform operations of:

determining a first subframe; and/or determining a second subframe according to the first subframe; and performing a physical downlink control channel (PDCCH) monitoring according to the first subframe and/or the second subframe, wherein the UE is not required to monitor a narrowband physical downlink control channel (NPDCCH) in a subframe after the first subframe and before the second subframe.

13. The UE of claim 12, wherein the UE is configured to receive a first transmission, and the first transmission ends in the first subframe.

14. The UE of claim 13, wherein the first transmission comprises a narrowband physical downlink shared channel (NPDSCH) transmission or an NPDCCH transmission, wherein the NPDSCH transmission is scheduled by a downlink control information (DCI) format, wherein the DCI format comprises a DCI format N1 and/or a DCI format N2, wherein the NPDCCH is configured with a PDCCH order, and wherein the PDCCH order initiates a random access channel (RACH) procedure.

15. The UE of claim 12, wherein the UE is configured to perform a second transmission starting in the second subframe or starting later than the second subframe, wherein the second transmission comprises a narrowband physical uplink shared channel (NPUSCH) transmission or a physical random access channel (PRACH) transmission, wherein the NPUSCH transmission comprises an acknowledgement (ACK)/non-acknowledgement (NACK) information corresponding to the reception of the first transmission, wherein the PRACH transmission is requested by the PDCCH order.

16. The UE of claim 12, wherein the UE determining the second subframe according to the first subframe comprises that the second subframe is a number of subframes after the first subframe, where the number comprises a first amount and/or a second amount and/or a third amount, wherein the first amount is determined at least from a first information, and the DCI format provides the first information, wherein the second amount is determined at least from a second information, and the second information is provided in a system information and/or a UE-specific radio resource control (RRC).

17. A base station, comprising:

a memory;

a transceiver; and a processor coupled to the memory and the transceiver;

wherein the processor is configured to perform operations of:

controlling a user equipment (UE) to determine a first subframe; and/or determine a second subframe according to the first subframe; and controlling the UE to perform a physical downlink control channel (PDCCH) monitoring according to the first subframe and/or the second subframe, wherein the base station controls the UE in a way that the UE is not required to monitor a narrowband physical downlink control channel (NPDCCH) in a subframe after the first subframe and before the second subframe.

18. The base station of claim 17, wherein the base station controls the UE to transmit a first transmission, and the first transmission ends in the first subframe, wherein the first transmission comprises a narrowband physical uplink shared channel (NPUSCH) transmission, and the NPUSCH is associated with a hybrid automatic repeat request (HARQ) process identifier (ID), wherein the second subframe is a number of subframes after the first subframe, where the number comprises a third amount, and wherein the third amount is relevant to a time offset between a downlink timing and an uplink timing.

19. The base station of claim 18, wherein the third amount is determined at least from a third information, and the third information is provided in a system information and/or a UE-specific RRC, wherein the third information comprises a second time duration or a third number of subframes, wherein the third amount is greater than or equal to the third number.

20. The base station of claim 18, wherein the third amount comprises a second integer, and the second integer is a smallest integer such that the second integer times a subframe duration is greater than or equal to the second time duration.

* * * * *